United States Patent
Qi et al.

(10) Patent No.: US 12,548,220 B2
(45) Date of Patent: Feb. 10, 2026

(54) DATA-DRIVEN GATING BASED UPON GROUPING FEATURES IN SHORT IMAGE DATA SEGMENTS

(71) Applicants: The Regents of the University of California, Oakland, CA (US); CANON MEDICAL SYSTEMS CORPORATION, Tochigi (JP)

(72) Inventors: Jinyi Qi, Oakland, CA (US); Tiantian Li, Oakland, CA (US); Zhaoheng Xie, Oakland, CA (US); Wenyuan Qi, Vernon Hills, IL (US); Li Yang, Vernon Hills, IL (US); Chung Chan, Vernon Hills, IL (US); Evren Asma, Vernon Hills, IL (US)

(73) Assignees: The Regents of the University of California, Oakland, CA (US); CANON MEDICAL SYSTEMS CORPORATION, Tochigi (JP)

( * ) Notice: Subject to any disclaimer, the term of this patent is extended or adjusted under 35 U.S.C. 154(b) by 384 days.

(21) Appl. No.: 17/965,289

(22) Filed: Oct. 13, 2022

(65) Prior Publication Data
US 2023/0351646 A1 Nov. 2, 2023

Related U.S. Application Data

(60) Provisional application No. 63/335,509, filed on Apr. 27, 2022.

(51) Int. Cl.
*G06T 11/00* (2006.01)
*G06T 7/20* (2017.01)
(Continued)

(52) U.S. Cl.
CPC .............. *G06T 11/005* (2013.01); *G06T 7/20* (2013.01); *G06V 10/44* (2022.01);
(Continued)

(58) Field of Classification Search
CPC .................... G06T 11/005; G06T 7/20; G06T 2207/10104; G06T 2207/20081;
(Continued)

(56) References Cited

U.S. PATENT DOCUMENTS 11,983,869 B2 * 5/2024 Hébert .................. G06T 7/0012
2017/0328970 A1 * 11/2017 Bi .......................... A61B 5/055
(Continued)

OTHER PUBLICATIONS

Han Zhang, et al. "Self-Attention Generative Adversarial Networks," arXiv preprint arXiv:1805.08318, 2018; 10 pages.

*Primary Examiner* — Shefali D Goradia
(74) *Attorney, Agent, or Firm* — Oblon, McClelland, Maier & Neustadt, L.L.P.

(57) ABSTRACT

A method, apparatus, and computer instructions stored on a computer-readable medium perform latent image feature extraction by performing the functions of receiving image data acquired during an imaging of a patient, wherein the image data includes motion by the patient during the imaging; segmenting the image data to include M image data segments corresponding to at least N motion phases having shorter durations than a duration of the motion by the patient during the imaging, wherein M is a positive integer greater than or equal to a positive integer N; producing, from the M image data segments, at least N latent feature vectors corresponding to the motion by the patient during the imaging; and performing a gated reconstruction of the N motion phases by reconstructing the image data based on the at least N latent feature vectors.

26 Claims, 12 Drawing Sheets

(51) Int. Cl.
  *G06V 10/44* (2022.01)
  *G06V 10/762* (2022.01)
  *G06V 10/82* (2022.01)
  *G06V 20/40* (2022.01)

(52) U.S. Cl.
  CPC .......... *G06V 10/7635* (2022.01); *G06V 10/82* (2022.01); *G06V 20/49* (2022.01); *G06T 2207/10104* (2013.01); *G06T 2207/20081* (2013.01)

(58) Field of Classification Search
  CPC ........ G06V 20/49; G06V 10/82; G06V 10/44; G06V 10/763
  See application file for complete search history.

(56) References Cited

U.S. PATENT DOCUMENTS

| | | |
|---|---|---|
| 2018/0047155 A1 | 2/2018 | Ravishankar et al. |
| 2018/0174360 A1* | 6/2018 | Feng .................. A61B 6/00 |
| 2019/0282186 A1 | 9/2019 | Feng et al. |
| 2020/0302619 A1 | 9/2020 | Lu et al. |
| 2023/0352133 A1* | 11/2023 | Chen .................. G16H 30/20 |

\* cited by examiner

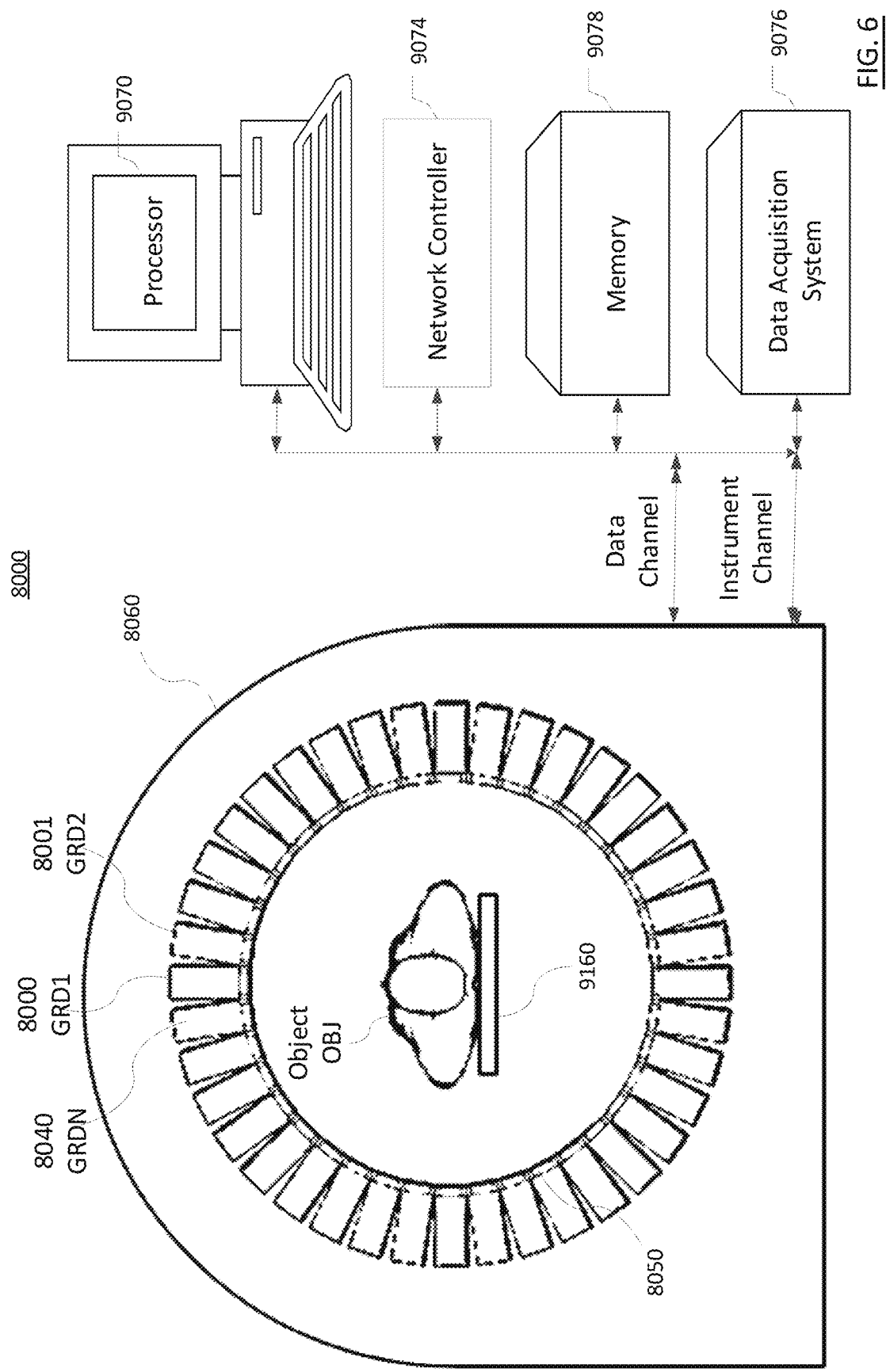

DATA-DRIVEN GATING BASED UPON GROUPING FEATURES IN SHORT IMAGE DATA SEGMENTS

CROSS-REFERENCE TO RELATED APPLICATIONS

The present application is related to and claims priority under 35 U.S.C. § 119(e) to provisional Application Ser. No. 63/335,509, filed Apr. 27, 2022, the contents of which are incorporated herein by reference.

FIELD

The present disclosure is a method for reducing the artifacts of patient motion during nuclear medicine, e.g., Positron Emission Tomography (PET), image data acquisition, and in one embodiment to a method and system for applying an autoencoder network to sinogram image data to provide data-driven gating in PET imaging.

BACKGROUND

In PET imaging, artifacts such as the blurring of images due to patient motion has led to over-estimation of lesion volumes and under-estimation of lesion activity. This makes motion corrected image reconstruction valuable for PET imaging. In some contexts, motion correction can be addressed by gating acquired data in which motion may have occurred. Gating involves dividing data into separates chunks (gates) within which motion is negligible. This may occur during voluntary or involuntary movement of the patient, and may include, for example, movement due to respiration or heartbeat.

In known PET scan systems, gating is done by attaching motion sensors to a patient during a PET scan. Such external motion sensors make PET scans more cumbersome as their use requires motion information to be successfully recorded during the scan. If motion is not recorded correctly or properly synchronized with the scan, then motion correction often is hampered.

Due to the additional challenges in using external motion trackers which require technicians to place motion trackers on or around patients, there is increased interest in data-driven gating without the need for motion trackers. Data-driven gating is sometimes performed by applying signal separation techniques such as Independent Component Analysis (ICA) or Principal Component Analysis (PCA) which can be relatively time consuming than the method of this disclosure.

SUMMARY

Data-driven gating is performed based on latent features extracted from image data (e.g., sinogram image data (including, but not limited to time-of-flight (TOF) sinogram image data and non-TOF sinogram image data) and/or image domain image data). As an initial step, processing circuitry (hereinafter a "latent feature extractor") configured to extract latent features has to be configured and/or trained to extract latent features from image data such as can be created by segmenting the image data into image data segments. In one embodiment, the latent feature extractor is implemented by training an untrained neural network (e.g., an autoencoder) to extract the latent features in each of the image data segments and output a corresponding latent feature vector representing the latent features for each of the image data segments. When implemented as a neural network, the latent feature extractor can be trained in a self-supervised fashion "from scratch" for each patient using image data specific only to each patient. Alternatively, a network can be initialized with previous training results and fine-tuned using patient-specific data to reduce training time; or the network can be pre-trained with a sufficient amount of existing data and directly applied to a new patient data without additional training for the new patient.

Time durations of the image data segments can be different, and exemplary embodiments in PET imaging use image data segments having durations varying from between 0.05 secs and 2 seconds. To do so, list mode data can be selected according to the desired segment lengths.

Extracted latent feature vectors can be clustered so as to create groups or sets of latent feature vectors that correspond to image data segments that correspond to a same portion of a motion phase or cycle (e.g., respiratory phase or cardiac phase). The groups or sets of image data segments can be created, for example, by grouping the latent feature vectors into sets with K-means clustering or by using other unsupervised algorithms such as Gaussian Mixture Model, Spectral Clustering, SVM or supervised algorithm such as Logistic regression, Naive Bayes, Decision tree. Combining data segments with similar features increases the possibility that motion between those segments is negligible or minimal and that similar feature vectors (and therefore their corresponding image segments) belong to the same gate. Thus, by reconstructing the image segments group-by-group the blur or other motion artifacts in the reconstructed image is reduced.

According to one aspect of the disclosure, there is provided a medical imaging method for data-driven reconstruction, comprising: (1) receiving sinogram image data acquired during an imaging of a patient, wherein the sinogram image data includes motion by the patient during the imaging; (2) segmenting the sinogram image data into M image data segments each having a shorter duration than a duration of N motion phases of the motion by the patient during the imaging, wherein M is a positive integer greater than or equal to N, which is a positive integer; (3) producing, from the M sinogram image data segments, N sets of latent feature vectors corresponding to the N motion phases of the motion by the patient during the imaging; and (4) performing a reconstruction of the N motion phases by reconstructing, on a set-by-set basis, the sinogram image data associated with the N sets of latent feature vectors.

According to another aspect of the disclosure, there is provided a medical imaging method for data-driven gating, comprising: (1) receiving first image data acquired during a first imaging of a first patient, wherein the first image data includes motion by the first patient during the first imaging; (2) segmenting the first image data into M image data segments each having a shorter duration than a duration of N motion phases of the motion by the first patient during the first imaging, wherein M is a positive integer greater than or equal to N, which is a positive integer; (3) producing, from the M image data segments, a trained neural network for generating latent feature vectors corresponding to the motion by the first patient during the first imaging; (4) receiving second image data acquired during a second imaging of a second patient, wherein the second image data includes motion by the second patient during the second imaging; (5) segmenting the second image data into include second-patient image data segments; (6) inputting the second-patient image data segments to the trained neural network to produce second-patient latent feature vectors corresponding to the motion by the second patient during the second imaging; and (7) performing a reconstruction of the N motion phases by reconstructing, on a set-by-set basis, the second image data based on the second-patient latent feature vectors.

According to another aspect of the disclosure, there is provided A medical imaging method for data-driven reconstruction, comprising: (1) receiving image data acquired during an imaging of a patient, wherein the image data includes motion by the patient during the imaging; (2) segmenting the image data into M image data segments having a shorter duration than a duration of N motion phases of the motion by the patient during the imaging, wherein M is a positive integer greater than or equal to N which is a positive integer; (3) producing, from the M image data segments, N sets of latent feature vectors corresponding to the N motion phases of the motion by the patient during the imaging by training an untrained variational autoencoder to produce latent feature vectors from the M image data segments; and (4) performing a reconstruction of the N motion phases by reconstructing, on a set-by-set basis, the image data associated with the N sets of latent feature vectors.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a schematic of a PET scanner and associated hardware, according to an exemplary embodiment of the present disclosure.

DETAILED DESCRIPTION

According to one aspect of this disclosure, a neural network acts as a latent feature extractor that extracts latent image features from image data segments such that the image data segments can be classified and/or grouped. The latent feature extractor can utilize at least one of sinogram image data and image domain image data.

Figure 1:
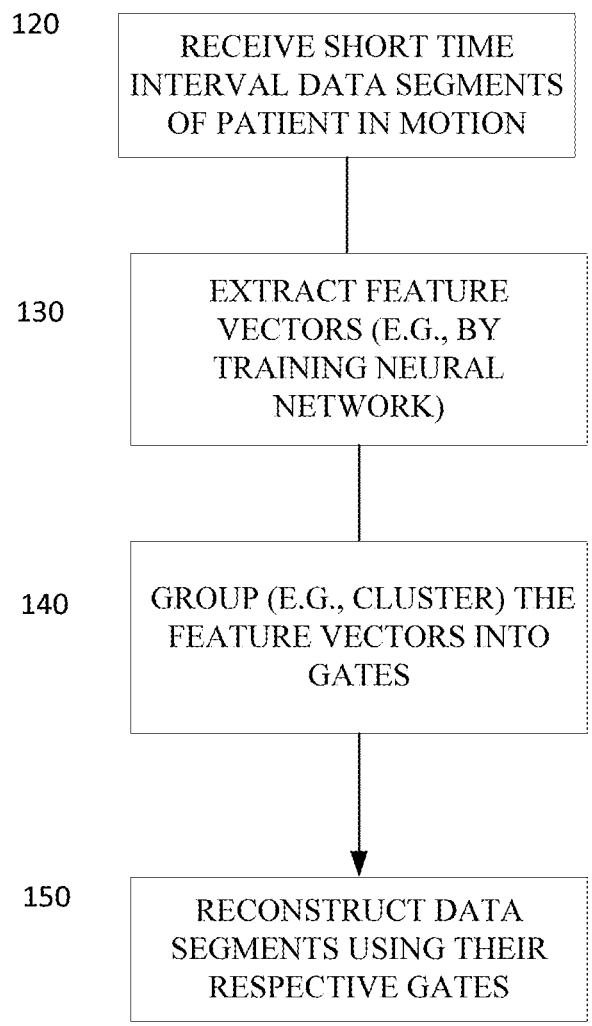
FIG. 1 shows a flow block diagram of a method to divide data segments into gates.

FIG. 1 shows a flow diagram of a method of obtaining image data from which gated image data is created. Such image data includes, but is not limited to, data obtained in nuclear medical imaging, such as Positron Emission Tomography (PET) imaging. PET scans are subject to blurring and other artifacts when a patient is in motion. Some of this motion is involuntary, such as from respiration and cardiac cycles, so it is difficult to remove. However, some of the effects of the motion can be mitigated by only reconstructing together segments of the image data that are from a same phase of the motion, such as from a same phase of a breathing cycle. In one such configuration, the breathing cycle is broken down into at least four phases: a first phase during inhaling, a second phase after inhaling but before exhaling, a third phase during exhaling, and a fourth phase after exhaling but before inhaling. By classifying each segment into one of the motions phases, blurring and other artifacts can be reduced.

As shown in FIG. 1, during the processing of function block 120, the method receives image data (e.g., sinogram image data or image domain image data) acquired during an imaging of a patient, wherein the image data includes motion by the patient during the imaging. The image data undergoes segmenting so that the image data is segmented to include at least "m" image data segments corresponding to at least "n" motion phases having shorter durations than a duration of the motion by the patient during the imaging. In general, "m" is a positive integer greater than or equal to a positive integer "n", and in a non-limiting embodiment described in the context of respiratory motion, at least four image data segments are created that correspond at least to the four phases of breathing. The image segmentation can be performed by extracting list mode data for the corresponding phases.

During the processing of function block 130, a feature extractor is configured to produce latent feature vectors that represent latent features extracted from each of the image data segments. For example, a number of segments can be extracted from the image data to produce a set of image data segments large enough to train the encoder/decoder pair shown in FIG. 2 which acts as the latent feature extractor. To train the encoder 210 and decoder 240, each segment in the set of image data segments is treated as an original input X that is input to the encoder 210. The encoder is designed to produce a latent feature vector (z) (labeled 230) that is then applied to a decoder 240 to produce an output X' that is a reconstructed version of the input X. In a first exemplary embodiment, the segments are two dimensional images, and in a second exemplary embodiment the segments are three dimensional image volumes. In an implementation of the second exemplary embodiment, a 200×200×100 set of image data is converted to a 64×64×200 latent feature vector. By modifying the weights (e.g., using a backpropagation process) internal to the encoder 210 and the decoder 240, a latent feature extractor can be taught how to generate an approximation X' that accurately approximates X from a latent feature vector z. To do so, the weights may be modified to minimize a loss function representing the difference between X and X' for each of the segments input to the encoder/decoder pair. The encoder/decoder pair is trained in a self-supervised fashion, i.e., the input and target are the same short frame data sets. To emphasize motion information extraction, the target data sets can also be replaced by the difference data sets between the current short frame data set and a short frame data set from a few frames later. Loss functions applicable to training the encoder/decoder pair include, but are not limited to mean-squared-error (MSE), mean-absolute-error (MAE), and root-mean-square error (RMSE). In addition, the encoder/decoder pair can be trained with additional data from an external sensor. Exemplary external sensors include, but are not limited to, a belt-based motion sensor, a camera, LIDAR, and breathing sensor (including, but not limited to, a microphone for detecting a breathing phase of a patient).

According to one embodiment, the time intervals for the data segments are selected to be short time intervals to reduce the chance of motion within the time interval itself (as opposed to between segments). In such an embodiment, data segments are selected to be approximately 0.1 to 0.5 seconds in duration. However, longer segments (e.g., 1 or 2 secsegments) or shorter segments (e.g., 0.05 sec segments) also can be used depending on circumstances. As noted above, when using sinogram image data, the sinogram image data can be time-of-flight (TOF) sinograms or can be non-TOF sinograms. Image data used herein also can be corrected or uncorrected image data. When using corrected image data, corrections include, but are not limited to, scatter correction, attenuation correction, and denoising.

Figure 2A:
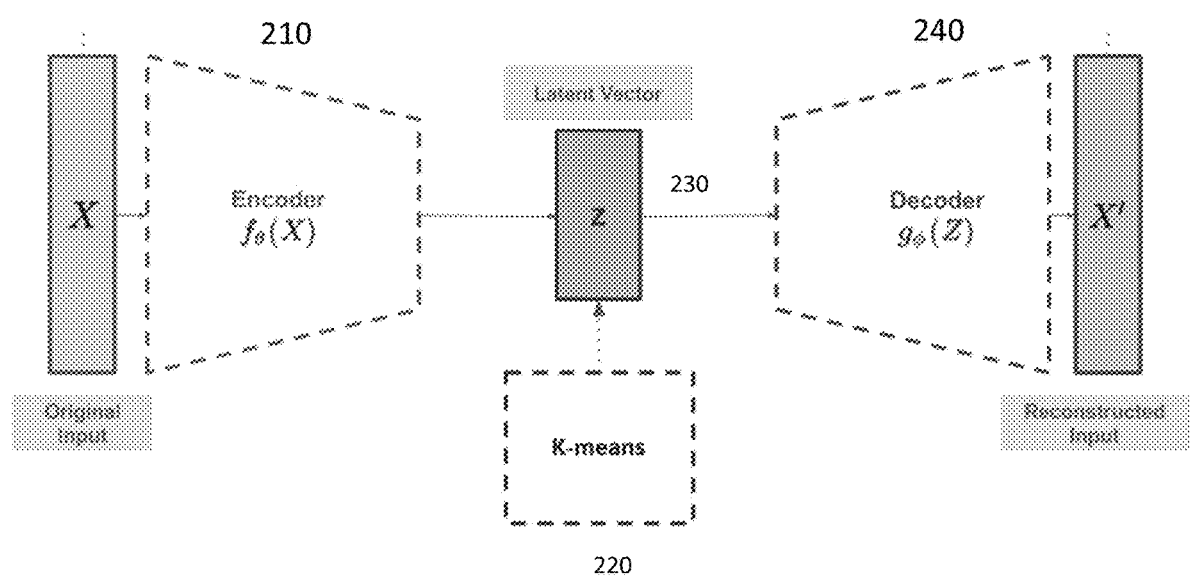
FIG. 2A shows a first exemplary latent feature extractor implemented as a first neural network.
Figure 2B:
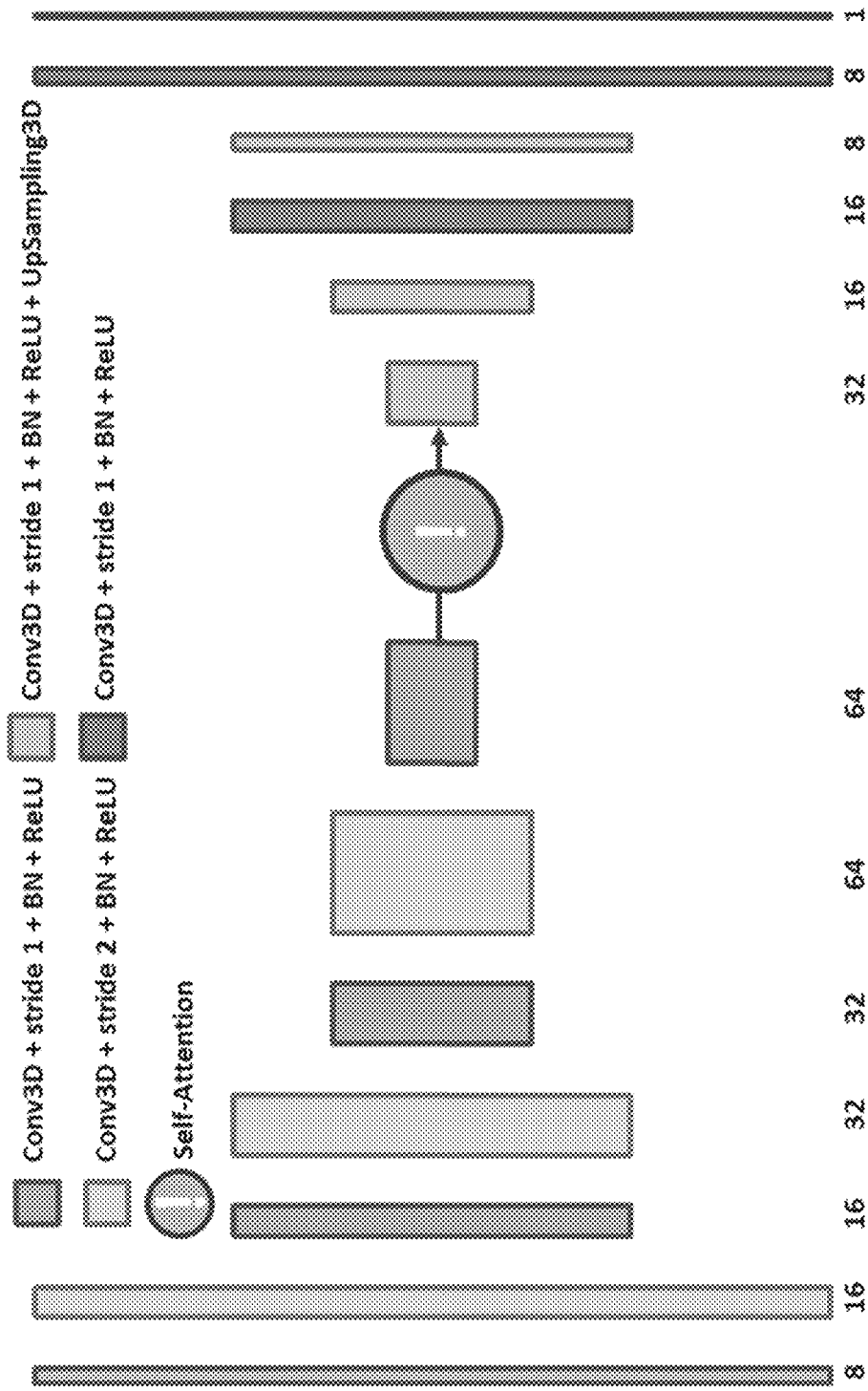
FIG. 2B shows an exemplary internal configuration of a neural network of FIG. 2A.

As shown in function block 130 of FIG. 1, features of the image data segments are extracted. In a neural network-based embodiment such as shown in FIGS. 2A and 2B, an encoder/decoder pair are trained to perform the extraction. FIG. 2B shows internal details of the structure of FIG. 2A and includes 14 layers including a self-attention gate such as the self-attention gate described in H. Zhang, I. Goodfellow, D. Metaxas, and A. Odena, "Self-attention generative adversarial networks," arXiv preprint arXiv:1805.08318, 2018, the contents of which are incorporated herein by reference. Such a self-attention gate may increase a model sensitivity response to a large range of image content. Such a network can be implemented in Keras 2.2.4 with a Tensorflow 1.5.0 backend and trained on a NVIDIA GTX 1080 Ti GPU in conjunction with the adaptive moment estimation (ADAM) optimizer with default parameter settings. Additional exemplary parameters include: a learning rate of 0. 0001, batch size of 1, and training using 10 epochs.

Figure 4A:
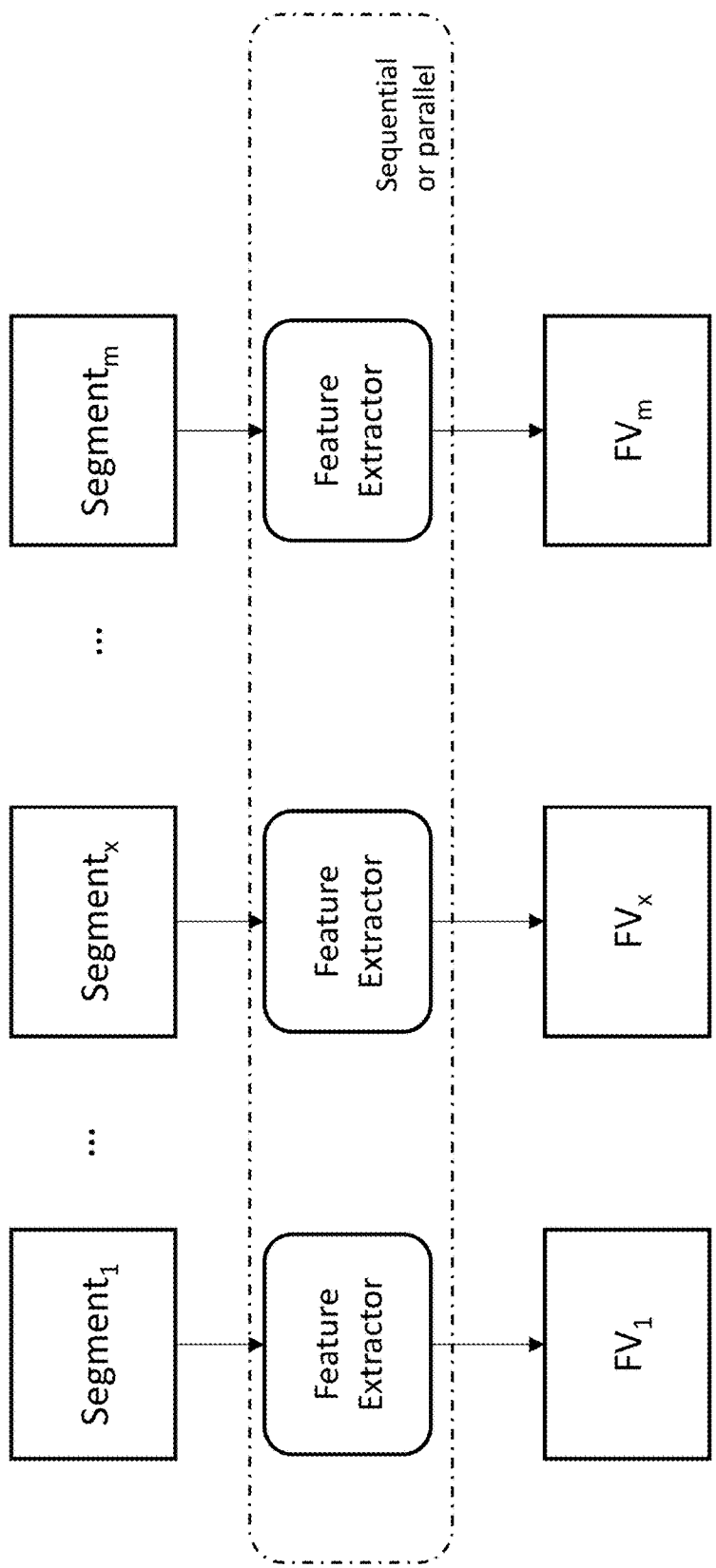
FIG. 4A shows a process of "m" image data segments being converted to "m" respective feature vectors (some of which may be the same as produced by other segments)
Figure 4B:
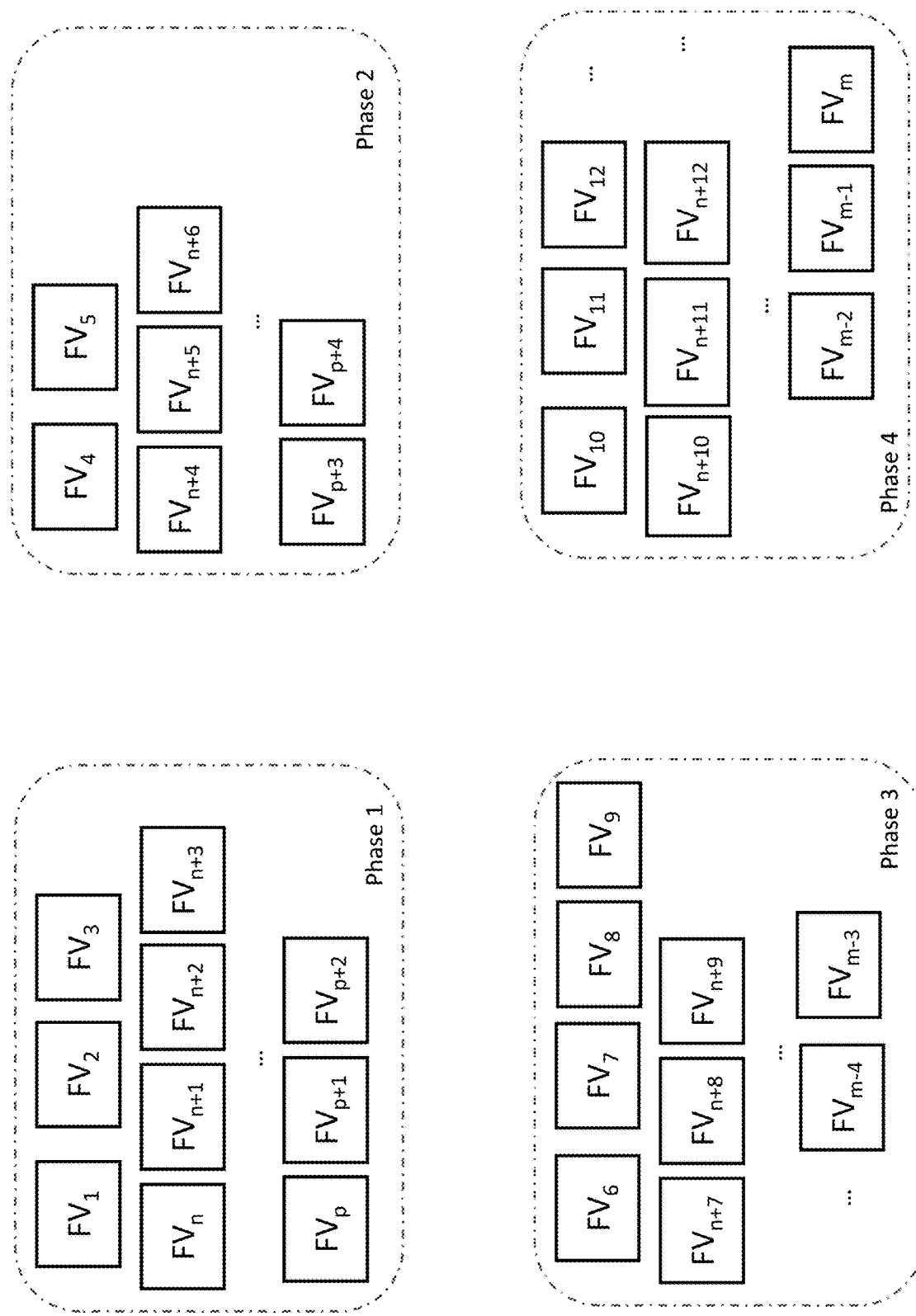
FIG. 4B shows a grouping (or clustering) of the "m" respective feature vectors into the "n" time phases.
Figure 4C:
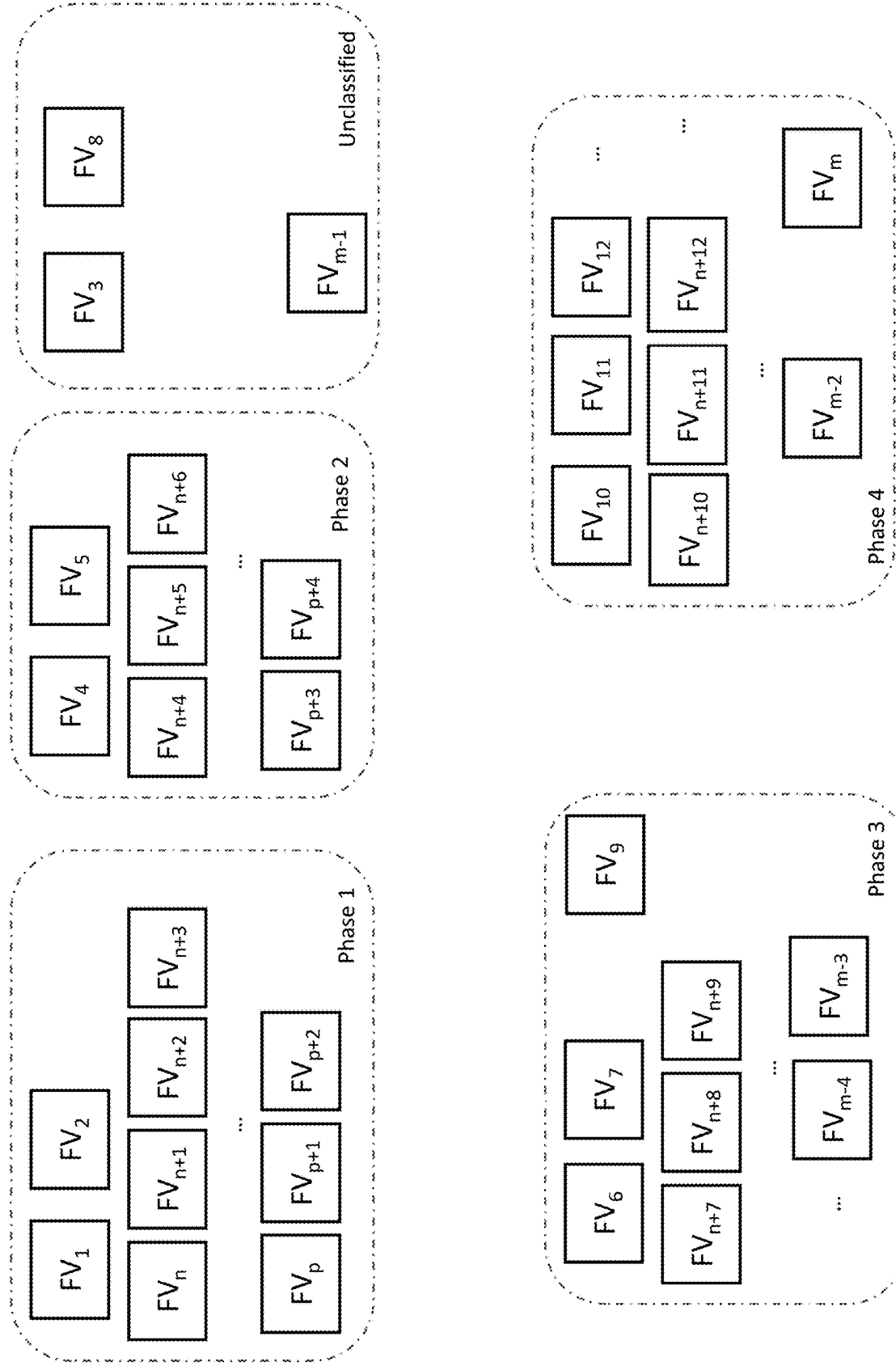
FIG. 4C shows a grouping (or clustering) of the "m" respective feature vectors into the "n" time phases and an "unclassified" set of feature vectors.

Having generated an encoder/decoder pair, the image data segments can be re-run through the encoder/decoder pair acting as a feature extractor to determine a latent feature vector (FV) for each segment as shown in FIG. 4A. The segments can be applied sequentially to a single feature extractor, or a series of feature extractors can be created according to the weighting of the trained encoder/decoder pair such that the segments can be converted to corresponding feature vectors at least partially in parallel. The corresponding latent feature vectors ($FV_1$ to $FV_m$) can then be grouped (as shown in FIGS. 4B and 4C) to allow the segments corresponding to the same motion type (or motion phase) to be grouped together for later reconstruction on a set-by-set basis as part of a gate reconstruction (or a set-by-set reconstruction). That is, as part of a gated reconstruction, the segments (e.g., segments 1, 2, n, n+1, n+2, n+3, p, p+1, p+2) corresponding to the feature vectors in Phase 1 are reconstructed as a group, the segments (e.g., segments 4, 5, n+4, n+5, n+6, p+3, p+4) corresponding to the feature vectors in phase 2 are reconstructed as a group, etc. Exemplary grouping methods include, but are not limited to clustering methods, such as unsupervised methods (e.g., Gaussian Mixture Model, Spectral Clustering, and SVM) and/or supervised methods (e.g., Logistic regression, Naive Bayes, and Decision tree). Such grouping methods may further include pre-processing steps to obtain initial cluster centers. For example, principal component analysis (PCA) can first be applied to the latent features and phase-based gating (e.g., based on respiratory cycles) can performed using the first principal component to obtain the initial cluster centers. Furthermore, to encourage the clustering to emphasize the respiratory motion more, each latent feature $z_i$ can be weighted by the maximum magnitude of the frequency component contained by $z_i$ inside the human breathing frequency range (such as 0.14-0.33 Hz). As shown in FIG. 4C, it is possible that at the end of the grouping process there remain a number of unclassified feature vectors, and those feature vectors can be excluded from the reconstruction process in general (e.g., not associated with the reconstruction of any of the "n" motion phases).

In Block 150, the image data segments are combined into data sets or gates of like segments, and similar segments are reconstructed together. In one embodiment, the method includes an optional step of validation of the gates. This optional quality assurance step can be performed by cross correlation with a network derived signal to ensure robustness of the data driven signal. It could also be through respiration phase identification such as phase match with other scans (CT, MR, etc.). One can also improve temporal resolution of the motion vector estimation with an external signal used to perform interpolation of estimate motion vectors to higher temporal resolution.

Figure 4D:
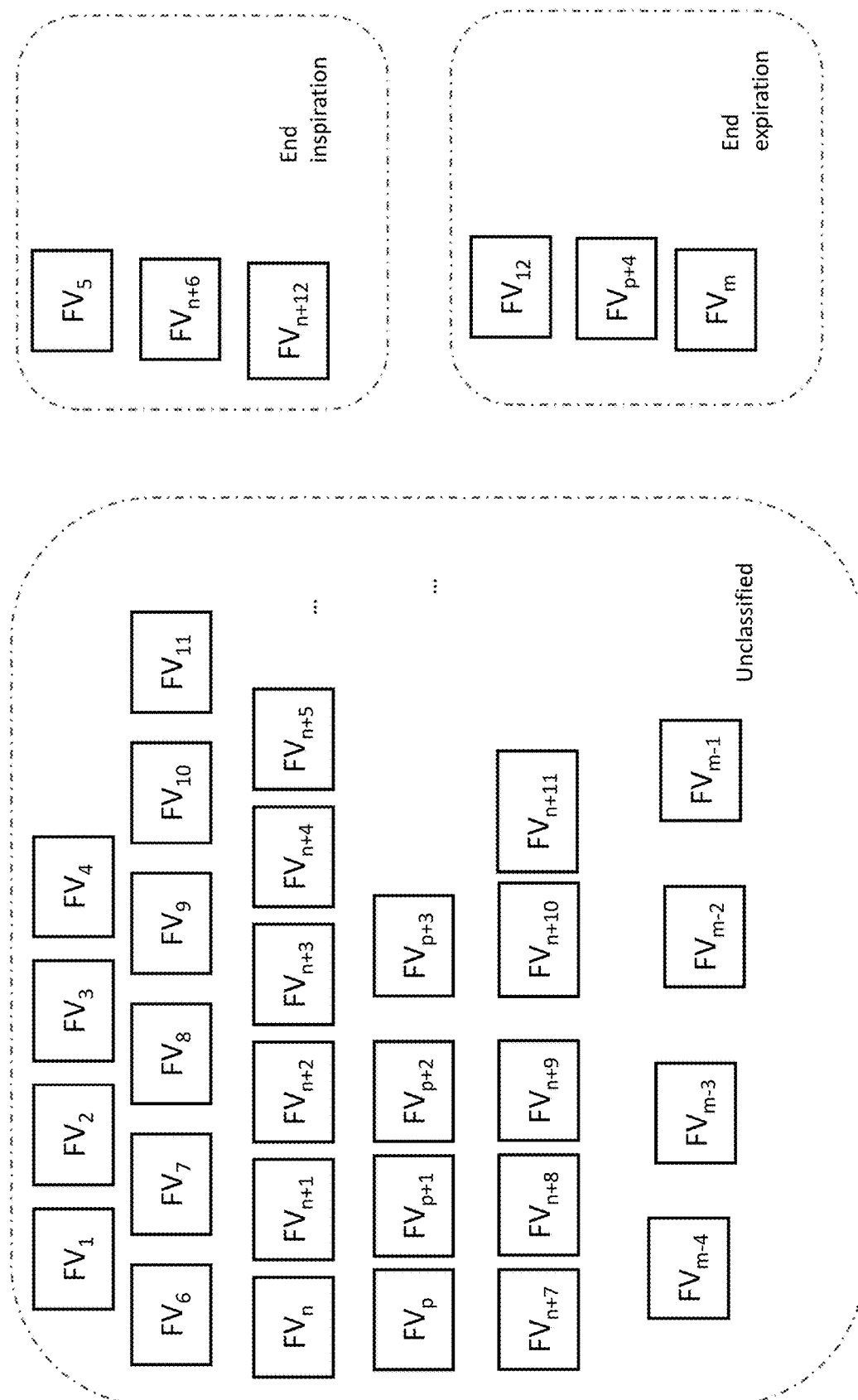
FIG. 4D shows a grouping (or clustering) of the "m" respective feature vectors into two time phases, one for the end of expiration and the other for the end of inspiration with the remaining feature vectors being treated as unclassified.

Alternate groupings of feature vectors also are possible. FIG. 4D shows a grouping (or clustering) of the "m" respective feature vectors into two time phases, one for the end of expiration and the other for the end of inspiration with the remaining feature vectors being treated as unclassified. In such a configuration, the segments corresponding to the end of expiration are reconstructed together while the segments corresponding to the end of inspiration are reconstructed together (independent of the segments corresponding to the end of expiration). The segments corresponding to the unclassified feature vectors may be reconstructed together, but they need not be.

Figure 4E:
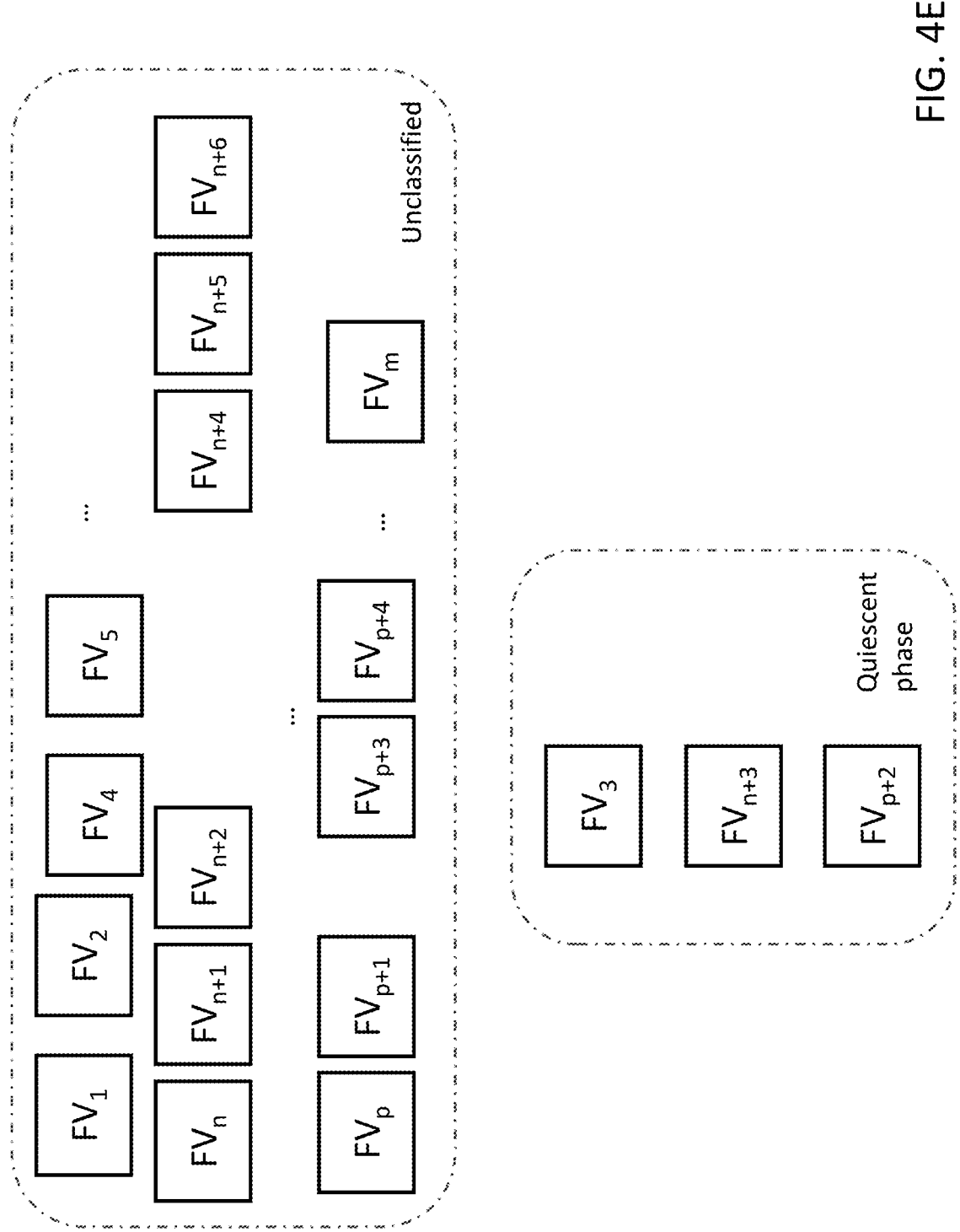
FIG. 4E shows a grouping (or clustering) of the "m" respective feature vectors into a single quiescent time phase with the remaining feature vectors being treated as unclassified.

In yet another embodiment, FIG. 4E shows a grouping (or clustering) of the "m" respective feature vectors into a single quiescent time phase with the remaining feature vectors being treated as unclassified.

Figure 4F:
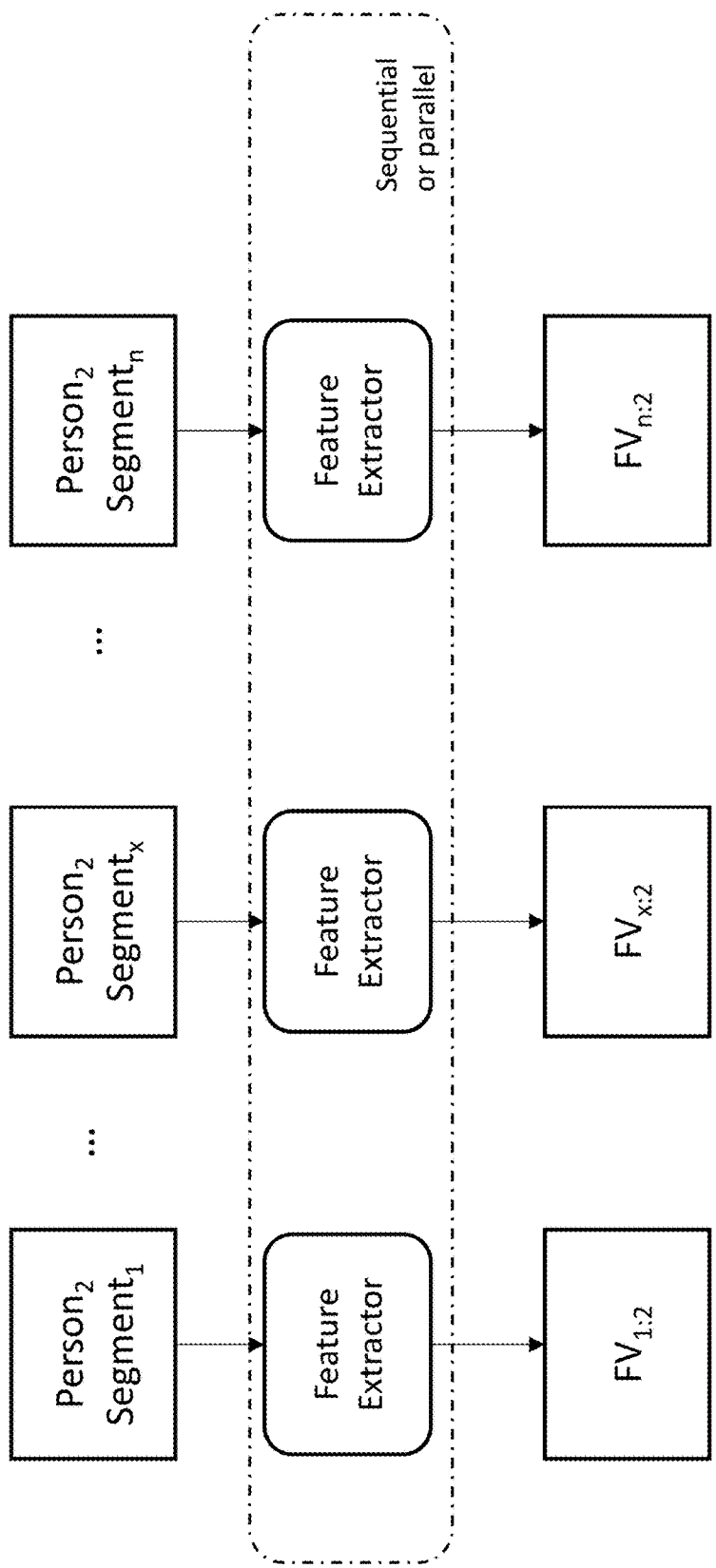
FIG. 4F shows a previously generated feature extractor being used to generate feature vectors (FV) for a person other than the person/people whose segments were originally used to create the feature extractor.

As shown in FIG. 4F, a feature extractor that is created using the segmented image data of others can be used as a proxy when producing the feature vectors for an additional person (e.g., $Person_2$). In this manner, a segment' for $Person_2$ produces a feature vector $FV_{1:2}$ using the previously produced feature vector (which also can be applied serially or at least partially in parallel).

As described above, the encoder/decoder pair of FIGS. 2A and 2B can utilize a loss function during the training of the encoder/decoder pair. One such loss function L is given by: $L=\|x-g_\phi(f_\theta(x))\|^2$.

Reconstructions described herein can include, but are not limited to, filtered back projection (FBP) or Ordered Subsets Expectations Maximization (OSEM). The reconstructed image can be post-processed i.e. denoised using a deep neural network, non-local mean or a smoothing filter.

Figure 3:
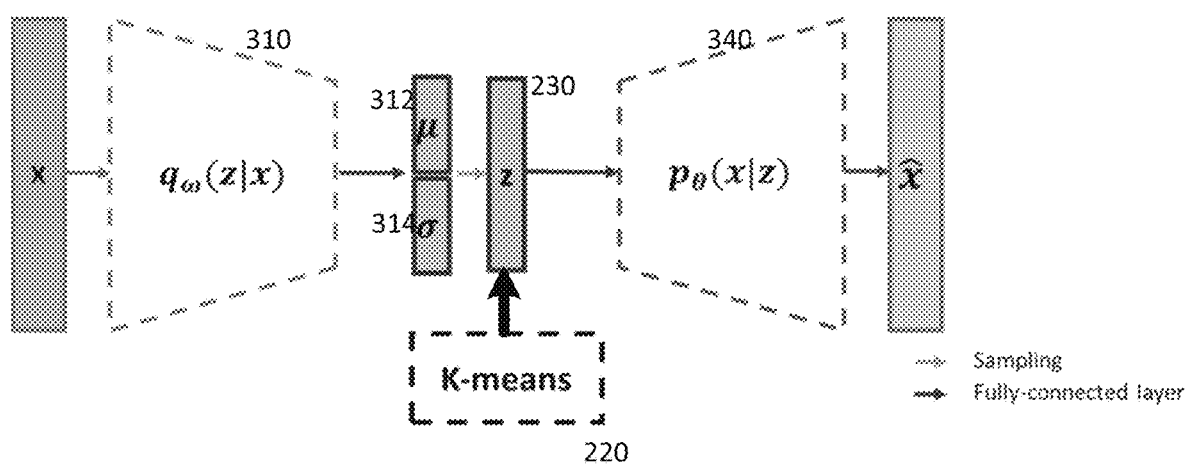
FIG. 3 shows a second exemplary latent feature extractor implemented as a second neural network.

FIG. 3 shows an additional exemplary embodiment of implementing a latent feature extractor as a trained neural network. In exemplary embodiment of FIG. 3, the output of the encoder 310 is applied to two additional processing functions (e.g., a root mean square error function 312 and a mean square error function) and the outputs of the those additional processing functions are sampled as occurs in a variational autoencoder (as opposed to an autoencoder). From the outputs of those additional processing functions, the system learns to produce the latent feature vectors 230 which are then applied to the decoder 340 that is jointly trained with the encoder 310. As discussed above with respect to FIGS. 2A and 2B, the latent feature vectors can then be grouped (e.g., clustered), and the grouped images reconstructed together, thereby reducing motion artifacts.

Figure 5:
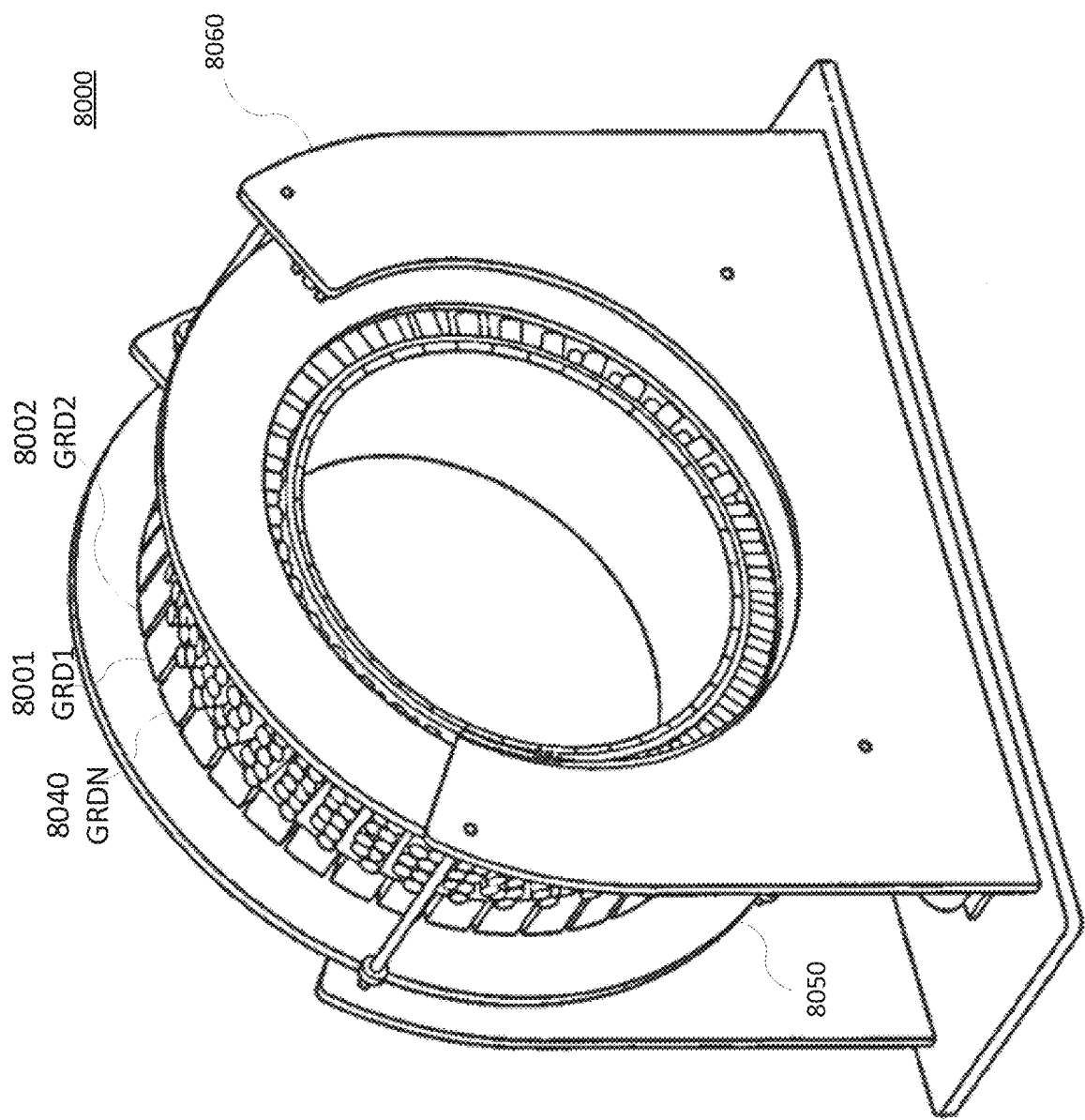
FIG. 5 is an illustration of a perspective view of a PET scanner, according to an exemplary embodiment of the present disclosure.

In an embodiment, it can be appreciated that the methods of the present disclosure may be implemented within a PET scanner, as shown in FIG. 5 and FIG. 6. Therefore, FIG. 5 and FIG. 6 show a PET scanner 8000 including a number of gamma-ray detectors (GRDs) 8001, 8002 . . . 8040 (e.g., GRD1, GRD2, through GRDN) that are each configured as rectangular detector modules. The PET scanner 8000 may be an adaptive axial Field of View (aaFOV) PET scanner. According to one implementation, each PET detector ring, which forms a cylindrical bore 8050 about a gantry 8060 includes tens of GRDs (e.g., 40-100). Using a higher number of GRDs creates a larger bore size for the PET scanner 8000. Each PET detector ring may be independently translatable about an axial length of the aaFOV PET scanner. The translation of each PET detector ring may be accomplished by manual manipulation and/or motorized manipulation. The GRDs include scintillator crystal arrays for converting the gamma rays into scintillation photons (e.g., at optical, infrared, and ultraviolet wavelengths), which are detected by photodetectors. Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs. Further, each GRD can include a number of PMTs of various sizes, each of which is arranged to receive scintillation photons from a plurality of detector crystals. Each PMT can produce an analog signal that indicates when scintillation events occur, and an energy of the gamma ray producing the detection event. Moreover, the photons emitted from one detector crystal can be detected by more than one PMT, and, based on the analog signal produced at each PMT, the detector crystal corresponding to the detection event can be determined using Anger logic and crystal decoding, for example. However, Anger arithmetic is not necessarily required when there is a one-to-one correspondence between the crystals and the photodetectors.

FIG. 6 shows a schematic view of a PET scanner system having GRDs 8001, 8002 . . . 8040 arranged to detect gamma-rays emitted from an object OBJ. The GRDs can measure the timing, position, and energy corresponding to each gamma-ray detection. In one implementation, the gamma-ray detectors are arranged in a PET detector ring, as shown in FIG. 5 and FIG. 6. It can be appreciated that the single PET detector ring of FIG. 6 can be extrapolated to include any number of PET detector rings along an axial length of the PET scanner. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 6 shows an example of the arrangement of the PET scanner 8000, in which the object OBJ to be imaged rests on a table 9160 and the GRD modules GRD1 8001 through GRDN 8040 are arranged circumferentially around the object OBJ and the table 9160. The GRDs may comprise a PET detector ring and may fixedly-connected to a cylindrical bore 8050 that is fixedly-connected to a gantry 8060. The gantry 8060 houses many parts of the PET scanner. The gantry 8060 of the PET scanner also includes an open aperture, defined by the cylindrical bore 8050, through which the object OBJ and the table 9160 can pass, and gamma-rays emitted in opposite directions from the object OBJ due to an annihilation event can be detected by the GRDs and timing and energy information can be used to determine coincidences for gamma-ray pairs.

In FIG. 6, circuitry and hardware are also shown for acquiring, storing, processing, and distributing gamma-ray detection data. The circuitry and hardware include a processor 9070, a network controller 9074 303, a memory 9078, and a data acquisition system (DAS) 9076. The PET imager also includes a data channel that routes detection measurement results from the GRDs to the DAS 9076, the processor 9070, the memory 9078, and the network controller 9074. The DAS 9076 can control the acquisition, digitization, and routing of the detection data from the detectors. In one implementation, the DAS 9076 controls the movement of the table 9160. The processor 9070 performs functions including adjusting PET detector rings, pre-reconstruction processing of the detection data, image reconstruction, and post-reconstruction processing of the image data.

According to an embodiment, the processor 9070 of the PET scanner 8000 of FIG. 5 and FIG. 6 can be configured to perform any of the methods described herein, as well as variations thereof. The processor 9070 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 9078 can be a hard disk drive, CD-ROM drive, DVD drive, FLASH drive, RAM, ROM or any other electronic storage known in the art. The memory 9078 may be non-volatile, such as ROM, EPROM, EEPROM or FLASH memory. The memory 9078 can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 9070 can execute a computer program including a set of non-transitory computer-readable instructions that perform the methods described herein, the program being stored in any of the above-described non-transitory computer-readable medium including electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a XENON® processor, or i3, i7 or i9 from Intel® or an OPTERON® or Ryzen processor from AMD of America and an operating system, such as Microsoft WINDOWS®, UNIX, Solaris®, LINUX, Apple MAC-OS® and other operating systems known to those skilled in the art. Further, CPU can be implemented as multiple processors locally or in a distributed cloud configuration cooperatively working in parallel to perform the instructions.

In one implementation, the PET scanner may include a display for displaying a reconstructed image and the like. The display can be an LCD display, CRT display, plasma display, OLED, LED, or any other display known in the art.

The network controller 9074, such as an Intel Ethernet PRO network interface card from Intel Corporation of America, can interface between the various parts of the PET imager. Additionally, the network controller 9074 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including GPRS, EDGE, 3G, 4G and 5G wireless cellular systems. The wireless network can also be Wi-Fi, Bluetooth, or any other wireless form of communication that is known.

Obviously, numerous modifications and variations are possible in light of the above teachings. It is therefore to be understood that within the scope of the appended claims, the invention may be practiced otherwise than as specifically described herein.

The method and system described herein can be implemented in a number of technologies but generally relate to imaging devices and/or processing circuitry for performing the processes described herein. In an embodiment in which neural networks are used, the processing circuitry used to train the neural network(s) need not be the same as the processing circuitry used to implement the trained neural network(s) that perform(s) the methods described herein. For example, an FPGA may be used to produce a trained neural network (e.g. as defined by its interconnections and weights), and the processor and memory can be used to implement the trained neural network. Moreover, the training and use of a trained neural network may use a serial implementation or a parallel implementation for increased performance (e.g., by implementing the trained neural network on a parallel processor architecture such as a graphics processor architecture).

In the preceding description, specific details have been set forth. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Moreover, any of the elements of the appended claims may be used in conjunction with any other claim element. Rather, any limitations to embodiments of the invention are presented in the following claims.

The invention claimed is:

1. A medical imaging method for data-driven reconstruction, comprising:
receiving sinogram image data acquired during an imaging of a patient, wherein the sinogram image data includes motion by the patient during the imaging;
segmenting the sinogram image data into M image data segments each having a shorter duration than a duration of N motion phases of the motion by the patient during the imaging, wherein M is a positive integer greater than or equal to N, which is a positive integer;
producing, from the M sinogram image data segments, N sets of latent feature vectors corresponding to the N motion phases of the motion by the patient during the imaging, wherein each of the latent feature vectors represents a feature of one of the M sinogram image data segments; and
performing a reconstruction of the N motion phases by reconstructing, on a set-by-set basis, the sinogram image data associated with the N sets of latent feature vectors.

2. The method according to claim 1, wherein the producing, further comprises clustering the M sinogram image data segments into N sets of latent feature vectors corresponding to the N motion phases of the motion by the patient during the imaging; and
wherein performing the reconstruction of the N motion phases further comprises performing the reconstruction of the N motion phases by reconstructing the image data based on the clustering of the M sinogram image data segments into N sets of latent feature vectors corresponding to the N motion phases of the motion by the patient during the imaging.

3. The method according to claim 2, wherein the clustering is performed by using at least one of a Gaussian Mixture Model, Spectral Clustering, and a support vector machine method.

4. The method according to claim 2, where the clustering is performed by using at least one of a logistic regression, a Naive Bayes method, and a decision-tree method.

5. The method according to claim 1, wherein durations of first and second motion phases of the N motion phases are different.

6. The method according to claim 1, wherein the producing further comprises training an untrained neural network to produce, from the M sinogram image data segments, the N sets of latent feature vectors.

7. The method according to claim 6, wherein the training comprises training the untrained neural network, which is at least one of an autoencoder and a variational autoencoder.

8. The method according to claim 6, wherein training the untrained neural network to produce, from the M sinogram image data segments, the N sets of latent feature vectors further comprises training the untrained neural network using a loss function.

9. The method according to claim 8, wherein the loss function is based on a metric including at least one of a mean-squared-error (MSE), a mean-absolute-error (MAE), and a root-mean-square error (RMSE).

10. The method according to claim 6, wherein the untrained neural network is trained by using only data specific to a current patient.

11. The method according to claim 1, wherein each of the N motion phases are in a range of 0.05 to 2.0 seconds.

12. The method according to claim 1, wherein N is at least four and each of the N motion phases corresponds to a different phase of breathing.

13. The method according to claim 1, wherein each of the N motion phases corresponds to a different cardiac phase.

14. The method according to claim 1, wherein the segmenting the sinogram image data into M image data segments further comprises extracting list mode data into the M image data segments.

15. The method according to claim 1, wherein the producing further comprises producing the N sets of latent feature vectors from respective differences between the M sinogram image data segments and M subsequent image data segments.

16. The method according to claim 1, wherein the reconstruction is a reconstruction without scatter correction.

17. The method according to claim 1, wherein the reconstruction is a reconstruction with scatter correction.

18. The method according to claim 1, wherein the M sinogram image data segments correspond to a single patient.

19. The method according to claim 1, wherein N is at least two and a first of the N motion phases corresponds to an end of expiration and a second of the N motion phases corresponds to an end of inspiration.

20. The method according to claim 1, wherein N is at least one and corresponds to a quiescent cardiac phase.

21. An image processing apparatus, comprising:
processing circuitry configured to perform the method of claim 1.

22. A non-transitory computer-readable medium having instructions stored therein that, when executed by at least one processor, cause the at least one processor to perform the method of claim 1.

23. A medical imaging method for data-driven gating, comprising:
receiving first image data acquired during a first imaging of a first patient, wherein the first image data includes motion by the first patient during the first imaging;
segmenting the first image data into M image data segments each having a shorter duration than a duration of N motion phases of the motion by the first patient during the first imaging, wherein M is a positive integer greater than or equal to N, which is a positive integer;
producing, from the M image data segments, a trained neural network for generating latent feature vectors, wherein each of the latent feature vectors represents a feature of one of the M image data segments and corresponds to the motion by the first patient during the first imaging;
receiving second image data acquired during a second imaging of a second patient, wherein the second image data includes motion by the second patient during the second imaging;
segmenting the second image data into second-patient image data segments;
inputting the second-patient image data segments to the trained neural network to produce second-patient latent feature vectors, wherein each of the second-patient latent feature vectors represents a feature of one of the second-patient image data segments and corresponds to the motion by the second patient during the second imaging; and
performing a reconstruction of the N motion phases by reconstructing, on a set-by-set basis, the second image data based on the second-patient latent feature vectors.

24. The method according to claim 23, wherein the first and second image data comprises sinogram image data.

25. The method according to claim 23, wherein the first and second image data comprises image domain image data.

26. A medical imaging method for data-driven reconstruction, comprising:
receiving image data acquired during an imaging of a patient, wherein the image data includes motion by the patient during the imaging;
segmenting the image data into M image data segments having a shorter duration than a duration of N motion phases of the motion by the patient during the imaging, wherein M is a positive integer greater than or equal to N which is a positive integer;
producing, from the M image data segments, N sets of latent feature vectors corresponding to the N motion phases of the motion by the patient during the imaging by training an untrained variational autoencoder to produce latent feature vectors from the M image data segments, wherein each of the latent feature vectors represents a feature of one of the M image data segments; and
performing a reconstruction of the N motion phases by reconstructing, on a set-by-set basis, the image data associated with the N sets of latent feature vectors.

* * * * *